United States Patent [19]
Sagane et al.

[11] Patent Number: 5,916,936
[45] Date of Patent: Jun. 29, 1999

[54] FLAME-RETARDANT THERMOPLASTIC RESIN COMPOSITION

[75] Inventors: Hiroshi Sagane, Osaka; Ryuki Hashitani, Tokyo, both of Japan

[73] Assignees: Daicel Chemical Industries, Ltd., Osaka; Techno Polymer Co., Ltd., Tokyo, both of Japan

[21] Appl. No.: 08/826,752

[22] Filed: Mar. 24, 1997

[30] Foreign Application Priority Data

Mar. 26, 1996 [JP] Japan .......................................... 8-69735

[51] Int. Cl.$^6$ .............................. C08L 51/04; C08L 63/00
[52] U.S. Cl. ............................................ 523/407; 523/436
[58] Field of Search ..................................... 523/436, 407

[56] References Cited

U.S. PATENT DOCUMENTS

| | | | |
|---|---|---|---|
| 5,250,590 | 10/1993 | Nakai et al. ............................. | 523/435 |
| 5,376,718 | 12/1994 | Yada ....................................... | 524/409 |

FOREIGN PATENT DOCUMENTS

0496258A2  7/1992  European Pat. Off. .

1-101350  4/1989  Japan .
6-93158   4/1994  Japan .

OTHER PUBLICATIONS

Patent Abstracts of Japan, vol. 013, No. 315 (C–619), Jul. 18 1989 (JP 01 101350 A).
Patent Abstracts of Japan, vol. 096, No. 005, May 31 1996 (JP 08 012852 A).
Patent Abstracts of Japan, vol. 096, No. 009, Sep. 30 1996 (JP 08 134313 A).

*Primary Examiner*—Frederick Krass
*Attorney, Agent, or Firm*—Birch, Stewart, Kolasch & Birch, LLP

[57] ABSTRACT

The present invention provide a flame-retardant resin composition having an extremely low adhesion to metals and excellent thermal stability and light resistance and free from the formation of black extraneous matter. A flame-retardant thermoplastic resin composition characterized by being prepared by incorporating 1 to 1,000 ppm of a basic inorganic compound (D) soluble in a solvent into a resin composition (C) composed of 60 to 98% by weight of a thermoplastic styrene resin (A) and 40 to 2% by weight of a halogenated epoxy flame-retardant (B) having a terminal epoxy group.

9 Claims, No Drawings

FLAME-RETARDANT THERMOPLASTIC RESIN COMPOSITION

BACKGROUND OF THE INVENTION

The present invention relates to a flame-retardant resin composition having excellent thermal stability and light resistance and an extremely low adhesion to metals and free from the formation of a black extraneous matter.

PRIOR ART

Styrene resins having excellent mechanical properties, moldability and appearance are used for various purposes, particularly they are used as materials for household appliances and housing of OA (office automation machine) equipments. In these fields, flame retardancy is demanded for reducing damage caused by fire, and an excellent light resistance is also demanded for reducing discoloration caused by being exposed to the light in a room for a long time.

On the other hand, as new molding techniques such as a hot-runner molding technique are developed, a higher quality is required of the resin material, and the resin material as free from defective molding as possible is demanded. In particular, in the hot runner molding technique wherein the molten resin is resident in a hot tip, the resultant moldings are inclined to have defects such as discoloration and formation of burn marks more severe than those of products of a conventional cold runner molding technique. Under these circumstances, a resin material having a high thermal stability is demanded. Particularly, resin materials which were made flame-retardant are inclined to have a poor thermal stability.

Recently, halogenated epoxy oligomers became being used as flame retardants, talking advantage of the balance between their flowability and impact resistance, as well as light resistance and also from the viewpoint of environmental protection. The halogenated epoxy oligomers are roughly classified into two groups, i.e. a group having a terminal epoxy group (unsealed type) and the other group having the terminal epoxy group to which tribromophenol was added to open the ring thereof (sealed type).

However, when the halogenated epoxy oligomer of the unsealded type is used, it sticks to metal parts such as a screw and barrel in the molding machine during the molding to cause defects such as the formation of an extraneous matter, even through the light resistance and thermal stability are excellent.

JP-A 1-101350 proposes a techniques for solving the above-described problem by adding 0.1 to 10 parts by weight of a basic inorganic compound such as hydrotalcite, and JP-A 6-93158 proposes a technique for improving the thermal stability by adding a specified zeolite. However, even though the thermal stability is improved by these techniques, the reduction in the impact resistance is unavoidable, since the substance added is in the form of granules and, in addition, the problem of the adhesion to the metals cannot be solved by them.

On the other hand, when the halogenated epoxy oligomer of the sealded type is used, the light resistance of the resultant product is seriously low, though the defects such as the adhesion to the metal or reduction in the thermal stability caused when that of the unsealed type is used are scarcely caused.

Thus, it is now impossible to obtain a flame-retardant resin material having excellent thermal stability and light resistance and a low adhesion to metals and free from the formation of a black extraneous matter by using the halogenated epoxy oligomer as the flame retardant.

SUMMARY OF THE INVENTION

After intensive investigations, the inventors have solved the above-described problem in the prior art by incorporating a basic inorganic compound soluble in a solvent into a flame-retardant resin comprising a thermosetting styrene resin and a halogenated epoxy flame-retardant having a terminal epoxy group, and have completed a flame-retardant resin composition having excellent thermal stability and light resistance and a low adhesion to metals and free from the formation of a black extraneous matter.

DEFINITION OF THE INVENTION

The invention provides a flame-retardant thermoplastic resin composition comprising a resin composition (C) composed of 60 to 90% by weight of a thermoplastic resin (A) selected from the group consisting of a rubber-reinforced resin (A-1) obtained by polymerizing a monomer component which is an aromatic vinyl monomer or a combination of the aromatic vinyl monomer with another monomer copolymerizable with this monomer in the presence of a rubber polymer and a mixture of the rubber-reinforced resin (A-1) and a polymer (A-2) of an aromatic vinyl monomer or a combination of the aromatic vinyl monomer with another monomer copolymerizable with this monomer and 40 to 2% by weight of a halogenated epoxy resin (B) having a terminal epoxy group(s) and represented by the following general formula (1):

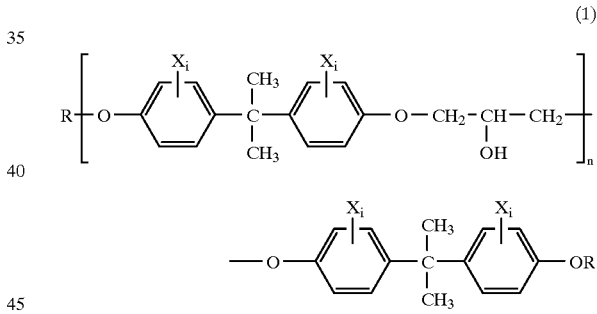

(1)

wherein X represents a halogen atom, n represents an integer of at least 0, i represents an integer in the range of 1 to 4, and R represents:

Y:

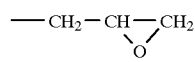

Y': hydrogen atom or

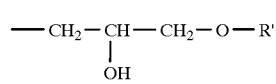

(R' being a phenyl group which may be substituted with a lower alkyl group and/or halogen atom, and the amount of Y being 100 to 40 molar % based on R) and 1 to 1,000 ppm, based on (C), of a basic inorganic compound (D) soluble in a solvent.

It is preferable that the basic inorganic compound (D) is a substance being soluble in water.

A preferable composition comprises 70 to 98 percent by weight of (A), 30 to 2 percent by weight of (B) and 1 to 800 ppm of (D). Another one comprises 75 to 97 percent by weight of (A), 25 to 3 percent by weight of (B) and 10 to 500 ppm of (D).

It is preferable that the basic inorganic compound (D) is selected from the group consisting of sodium hydroxide, potassium hydroxide, sodium carbonate, potassium carbonate, sodium hydrogencarbonate and potassium hydrogencarbonate.

The invention in addition provides a provides a process for producing the composition as defined above, which comprises the steps of dissolving a basic inorganic compound (D) in a solvent and mixing the obtained solution with the resin composition (C). The solvent is preferably water.

DETAILED DESCRIPTION

The concrete description on the present invention will be made below.

The thermoplastic resin (A) used in the present invention is a rubber-reinforced resin (A-1) obtained by graft-polymerizing a monomer component which is an aromatic vinyl monomer (b) of a combination of the aromatic vinyl monomer (b) with another monomer (c) copolymerizable with this monomer (b) in the presence of a rubbery polymer (a) or a mixture obtained by blending the rubber-reinforced resin (A-1) with a polymer (A-2) obtained by polymerizing the monomer component. The proportion of the rubber-reinforced resin (A-1) to the polymer (A-2), i.e. (A-1)/A-2), is preferably in the range of 100/0 to 5/95.

The rubbery polymers (a) used in the present invention include, for example, polybutadienes, polyisoprenes, styrene/butadiene copolymers, ethylene/a-olefin copolymers, ethylene/a-olefin/polyene copolymers, acrylic rubbers, silicone rubbers, styrene/butadiene block copolymers, hydrogenated styrene/butadiene block copolymers and hydrogenated butadiene copolymers. These rubbery polymers (a) are used either singly or in the form of a mixture of two or more of them.

The amount of the rubbery polymer (a) is preferably 10 to 70% by weight, still preferably 10 to 65% by weight and particularly preferably 15 to 65% by weight, based on the component (A-1). When the amount of the rubbery polymer (a) is less than 10% by weight, the impact resistance is insufficient and, on the contrary, when it is more than 70% by weight, the rigidity is insufficient.

The aromatic vinyl monomers (b) include, for example, styrene, t-butylstyrene, a-methylstyrene, p-methylstyrene and divinylbenzene. In these, styrene and a-methylstyrene are preferred. These aromatic vinyl monomers are used either singly or in the form of a mixture of two or more of them.

The amount of the aromatic vinyl monomer (b) contained in the component (A-1) is preferably 30 to 90% by weight, still preferably 35 to 80% by weight and particularly preferably 35 to 85% by weight. The amount of this monomer (b) in the component (A-2) is preferably 50 to 100% by weight, still preferably 60 to 100% by weight and particularly preferably 70 to 100% by weight.

The monomers (c) copolymerizable with other aromatic vinyl monomers (b) include cyanized vinyl monomers such as acrylonitrile and methacrylonitrile; acrylic esters such as methyl acrylate, ethyl acrylate and butyl acrylate; methacrylic esters such as methyl methacrylate, ethyl methacrylate and butyl methacrylate; unsaturated acid anhydrides such as maleic anhydride; unsaturated acids such as acrylic acid and methacrylic acid; and unsaturated dicarboxyl imides such as maleimide, N-phenylmaleimide and N-methylmaleimide. These monomers are used either singly or in the form of a mixture of two or more of them. The amount of the copolymerizable monomer in the component (A-1) is preferably not larger than 50% by weight, still preferably not larger than 40% by weight and particularly preferably not larger than 30% by weight, and that in the component (A-2) is preferably not larger than 50% by weight, still preferably not larger than 40% by weight and particularly preferably not larger than 30% by weight.

The component (A) can be produced by a known polymerization method such as emulsion polymerization, suspension polymerization, solution polymerization or bulk polymerization process without any particular limitation. In them, the emulsion polymerization is preferred from the viewpoint of the blending operativity and extrusion operativity. The emulsion polymerization process wherein the solidification is conducted with an acid coagulation methods is still preferred.

The halogenated epoxy resins (B) used in the present invention are represented by the above general formula (1). The halogen atom X in the component (B) is bromine, chlorine or the like. To obtain a high flame-retarding effect, bromine is preferred. i which is an integer in the range of 1 to 4 is preferably 2.

The terminal group R in the component (B) is the following Y and/or Y':

Y:

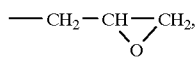

Y': hydrogen atom or

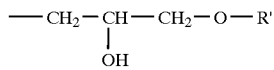

(R' being a phenyl group which may be substituted with a lower alkyl group and/or halogen atom.)

As for the ratio of Y to Y', supposing R=Y+Y'=100 molar %, the relative amount of Y is 100 to 40 molar %, preferably 100 to 45 molar % and still preferably 100 to 50 molar %. When Y is below 40 molar % based on R, the light resistance of the final composition is seriously lowered.

The molecular weight of the component (B) is preferably 1,300 to 50,000. When it is below 1,300, the heat resistance of the final composition is insufficient and, on the contrary, when it is increased to above 50,000 the flowability is decreased.

As for the relative amounts of the styrene resin (A) and the flame-retarding component (B) in the flame-retardant resin composition of the present invention, the amount of the component (A) is 60 to 98% by weight, preferably 70 to 98% by weight and still preferably 75 to 97% by weight, and that of the component (B) is 40 to 2% by weight, preferably 30 to 2% by weight and still preferably 25 to 3% by weight with proviso that the component (A)+component (B) is 100% by weight. When the relative amount of the component (B) is less than 2% by weight the sufficient flame retardancy cannot be realized. On the contrary, when the relative amount of the component (B) is more than 40% by weight, the impact resistance of the flame-retardant resin composition is lowered.

The basic inorganic compound (D) used in the present invention is a substance soluble in a solvent. The solvents usable herein are pure solvents usually available on the market such as water; alcohols, e.g. methanol and ethanol; ketones, e.g. acetone and methyl ethyl ketone; and halogenated hydrocarbons, e.g. chloroform and methylene chloride. They do not include solutions such as an aqueous sulfuric acid solution, sodium chloride solution or a mixture of two or more solvents. The expression "a substance is soluble in a solvent" indicates that at least 1 g of the substance is soluble in 100 g of the solvent. Although a substance soluble in any of the above-described solvents is usable in the present invention, a water-soluble substance is preferred from the viewpoint of the easiness. When the basic inorganic compound (D) has such a solubility that only less than 1 g thereof is soluble in 100 g of the solvent, the impact resistance and thermal stability of the final composition are poor and the formation of black extraneous matter is unavoidable.

The basic inorganic compounds usable in the present invention are not particularly limited so far as they exhibit basicity against HCl. They include, for example, hydroxides such as lithium hydroxide, sodium hydroxide, potassium hydroxide, cesium hydroxide, rubidium hydroxide, strontium hydroxide and barium hydroxide; oxides such as potassium oxide, cesium oxide, rubidium oxide, magnesium oxide, calcium oxide, barium oxide and strontium oxide; carbonates such as sodium carbonate, potassium carbonate, cesium carbonate and magnesium carbonate; hydrogencarbonates such as lithium hydrogencarbonate, sodium hydrogencarbonate and potassium hydrogencarbonate; tetraborates such as sodium tetraborate (sodium tetraborate decahydrate; borax) and potassium tetraborate; metaborates such as sodium metaborate and potassium metaborate; metaphosphates such as sodium metaphosphate and potassium metaphosphate; monothiophosphates such as sodium monothiophosphate and potassium monothiophosphate; imidobisphosphates such as sodium imidobisphosphate and potassium imidobisphosphate; inorganic bases such as hydroxides and oxides of metallic elements, e.g. alkali metals including lithium, sodium, potassium, rubidium and cesium, alkaline earth metals including magnesium, calcium, strontium and barium, and the Group 3 elements including aluminum; carbonates, hydrogencarbonates, borates such as tetraborates and metaborates, phosphates such as monothiophosphates and imidobis(phosphates) of these metallic elements and ammonium; and inorganic basic salts comprising a weak acid and a strong base.

In these compounds, the alkali metal and alkaline earth metal hydroxides, oxides, carbonates and hydrogencarbonates are preferred.

The amount of the basic inorganic compound (D) is 1 to 1,000 ppm, preferably 1 to 800 ppm and still preferably 10 to 500 ppm, based on the resin composition (C). When the amount of the component (D) is larger than 1,000 ppm based on the resin composition (C), the adhesion to metals is increased and, on the contrary, when it is less than 1 ppm, the formation of the black extraneous matter is unavoidable and the thermal stability cannot be attained.

The basic inorganic compound (D) used in the present invention is incorporated into the composition preferably by preparing a solution of the basic inorganic compound and then incorporating the obtained additive solution into the composition. The solvents usable herein include water; alcohols such as methanol and ethanol; ketones such as acetone and methyl ethyl ketone; and halogenated hydrocarbons such as chloroform and methylene chloride. The solvents are not particularly limited so far as the basic compounds are soluble therein.

The basic inorganic compound (D) used in the present invention is incorporated into the composition preferably by preparing an aqueous solution of the basic inorganic compound in the solvent and then incorporating the obtained aqueous additive solution into the composition.

The incorporation of the basic compound by preparing the additive solution is more desirable than the direct incorporation of the basic inorganic compound, since the dispersibility of the basic compound is excellent and the possibility of the reduction in the impact resistance is reduced in the former.

The method for the incorporation of the basic compound is also not limited. This compound can be incorporated in the form of a blend thereof with other components or it can be incorporated in the course of the extrusion/kneading.

The flame-retardant thermoplastic resin composition of the present invention can contain other flame-retardants and additives, if necessary, so far as the object of the invention is not damaged.

Examples of other flame retardants include halogen flame retardants such as tetrabromobisphenol A and derivatives thereof, tetrabromophthalic anhydride, brominated diphenyl ethers, brominated polycarbonate oligomers and terminal-modified products thereof, brominated (dibromo- or tribromo-)polystyrenes, brominated polyphenylene ethers and trisdibromophenyl phosphate; organophosphorus flame retardants such as triphenyl phosphate and triphenyl phosphite; and triazine flame retardants. These flame retardants may be used either singly or in the form of a mixture of two or more of them. The amount of these flame retardants is desirably not larger than 40 parts by weight for 100 parts by weight of the resin composition (C).

A flame-retarding assistant is usable for the purpose of improving the flame-retarding effect of the flame-retardant component. Examples of the flame-retarding assistants include antimony-containing compounds such as antimony trioxide, antimony tetrazoxide, (colloidal) antimony pentoxide, sodium antimonate, and antimony phosphate; and metal oxides such as zinc stannate. In these compounds, the antimony flame-retarding assistants are preferred, and antimony trioxide is particularly preferred. The amount of the flame-retarding assistant is desirably not larger than 15 parts by weight for 100 parts by weight of the resin composition (C).

The flame-retardant thermoplastic resin composition may contain another additive for imparting dripping resistance thereto. The additives include halogenated polyolefins such as a chlorinated polyethylene, polyvinyl chloride and polytetrafluoroethylene; silicone compounds such as a polydimethylsiloxane, a silicone rubber and a graft polymer obtained by graft-polymerizing the silicone rubber with a resin component; polyphenylene oxides; and phenolic resins. The amount of this additive is desirably not larger than 10 parts by weight for 100 parts by weight of the resin composition (C).

The flame-retardant thermoplastic resin composition of the present invention may further contain fillers such as glass fibers, carbon fibers, glass beads, talc, mica and kaolin, and well-known additives such as a coupling agent, an antioxidant, a plasticizer, a colorant, lubricant, an antistatic agent and an antibacterial agent. The amount of such an additive is desirably not larger than 100 parts by weight for 100 parts by weight of the resin composition (C).

The flame-retardant thermoplastic resin composition of the present invention may be blended with another polymer such as a polyethylene, polypropylene, polyphenylene ether, polyamide, polyester, polycarbonate, polysulfon, polyvinylidene fluoride, polyester elastomer or polyamide elastomer depending on the demanded properties. The amount of such a polymer is desirably not larger than 100 parts by weight for 100 parts by weight of the resin composition (C).

The flame-retardant thermoplastic resin composition of the present invention is obtained by kneading those components using various extruders, a Banbury mixer, a kneader or a roll. The components can be kneaded at once or by a multi-stage addition method.

The flame-retardant thermoplastic resin composition of the present invention thus obtained can be molded by, for example, injection molding, sheet-extrusion molding, vacuum molding or expansion molding method to form various moldings.

Technical Advantages

The flame-retardant thermoplastic resin composition of the present invention has an extremely low adhesion to metals and excellent thermal stability and light resistance and is free from the formation of black extraneous matter. The flame-retardant thermoplastic resin composition of the present invention has an extremely high industrial value and is thus industrially very useful, since the rate of the defectives including the formation of black extraneous matter and discoloration in the molding steps can be reduced and the composition is a resin material suitable for use as a material for products, of which only a slight change in color tone after the use for a long period of time is required, such as household appliances and OA equipments.

EXAMPLES

The following Examples will further illustrates the present invention, which by no means limit the invention. In the Examples, parts, percentages and ppm are given by weight.

Components of flame-retardant resin compositions used in Examples and Comparative Examples:

[Process for preparing rubber-reinforced resin (A-1)]

Monomeric components were polymerized in the presence of a rubbery polymer given in Table 1. The rubbery polymer content of the obtained rubber-reinforced resin and the ratio of the components constituting the matrix are given in Table 1. A rubber-reinforced resin (A-1)-1 was obtained by the well-known emulsion polymerization followed by the coagulation with sulfuric acid. A rubber-reinforced resin (A-1)-2 was obtained by the well-known bulk polymerization.

TABLE 1

Rubber-reinforced resin (A-1)

| Symbol | Rubbery polymer variety | content (%) | Matrix monomer component | polymerization ratio |
|---|---|---|---|---|
| (A-1)-1 | polybutadiene | 40 | styrene/acrylonitrile | 75/25 |
| (A-1)-2 | polybutadiene | 20 | styrene | 100 |

[Process for preparing polymer (A-2)]

Polymer (A-2) was prepared from the monomer components used in a ratio given in Table 2. Polymer (A-2)-1 was prepared by the known solution polymerization method and polymer (A-2)-2 was prepared by the known bulk polymerization method.

TABLE 2

Polymer (A-2)

| Symbol | Monomer component | Polymerization ratio |
|---|---|---|
| (A-2)-1 | styrene/acrylonitrile | 75/25 |
| (A-2)-2 | styrene | 100 |

[Preparation of halogenated epoxy flame-retardant]

Commercially available flame retardants given in Table 3 were used.

TABLE 3

Halogenated epoxy resin (B)

| Symbol | Variety | Sealing rate of terminal epoxy group* (%) | Molecular weight | Grade** |
|---|---|---|---|---|
| B-1 | terminal unsealed | 0 | 1600 | EP-16 |
| B-2 | terminal unsealed | 0 | 3000 | EP-30 |
| B-3 | terminal sealed | 100 | 2000 | EC-20 |

*sealed with tribromophenol
**products of Dainippon Ink & Chemicals, Inc.

[Preparation of antimony trioxide]

ATOX-S (a product of The Nippon Mining & Concentrating Co., Ltd.) was used.

[Preparation of basic compound]

An aqueous solution of a basic compound given in Table 4 or the basic compound per se was used.

TABLE 4

Basic inorganic compound (D)

| Symbol | Variety | Addition method |
|---|---|---|
| D-1 | sodium hydroxide | added in the form of 4% aqueous solution |
| D-2 | sodium hydrogencarbonate | added in the form of 4% aqueous solution |
| D-3 | sodium carbonate | added in the form of 4% aqueous solution |
| D-4 | A-type synthetic zeolite (Ca-type) | direct addition |

Examples 1 to 6 and Comparative Examples 1 to 5

The components each in an amount given in Tables 5 and 6 were measured and mixed together in a Henschel mixer for 3 minutes. The mixture was melt-extruded and granulated with a 50 mm twin-screw extruder at a cylinder temperature of 180° to 210° C. to obtain test pellets. The pellets were dried at 80° C. for 3 h and then injection-molded at a cylinder temperature of 210° C. and mold temperature of 50° C. to obtain test pieces. The results of the evaluation of the test pieces are shown in Tables 5 and 6. The evaluation methods were as described below.

<Heat-stable coloring and gelation tests>

70 g of the pellets were kneaded at 100 rpm in a labo-plastic mill kept at 270° C. The hue of the kneaded product was macroscopically observed and a change in the torque in the torque chart were examined.

Criteria of heated-stable coloring:

◯: slight coloring

Δ: considerable coloring x: serious coloring

Criteria of gelation:

○: Elevation in torque was only slight and the gelation was scarcely recognized.

Δ: The torque elevation and the gelation were recognized.

x: The torque elevation and the gelation were serious.

<Adhesion to metal>

The pellets were spread on a 50 μm stainless steel sheet. A 50 mm polyimide film was placed thereon, and the whole was hot-pressed at 230° C. for 30 minutes. The product was placed in a constant temperature bath kept at 180° C., and the tensile test was conducted by fixing a stainless steel sheet at one of fixtures of a tensile tester in the tank and the polyimide film at the other fixture thereof to conduct the tensile test. In this test, the polyimide film was turned up at 180° from the adhesion surface and pulled. The adhesion to the metal was judged from the state of the addition of the resin to the stainless steel sheet.

Criteria of adhesion:

○: The polyimide film adhered to the stainless steel sheet.

x: No adhesion.

<Falling weight impact test>

Flat plates (thickness: 2.4 mm, 55'80 mm) were prepared and then tested with a falling weight impact tester. The falling rate was 2.4 m/sec. The unit was (kg×cm).

<Light resistance>

Flat plates (thickness: 2.4 mm, 55'80 mm) were prepared and then the light resistance test of them was conducted with a xenon arc weather meter for 300 h. The degree of discoloration was determined with a color-difference meter to determine the color difference (ΔE).

Criteria:

○: ΔE<5

Δ: 5≦ΔE≦10 x: ΔE<10

In Comparative Examples 1 and 3 wherein no basic substance was added, the adhesion to the metal was high and the thermal stability was low.

In Examples 1 to 6 wherein the basic substance was added, the obtained compositions had excellent thermal stability, impact resistance and light resistance as well as a low adhesion to the metal.

In Comparative Example 2 wherein 2,000 ppm of sodium hydroxide was used, the adhesion to the metal was very high.

In Comparative Examples 4 and 5 wherein the synthetic zeolite was used, the properties were not improved at all by the addition of about 200 ppm thereof. Even when 1.0 parts of the synthetic zeolite was added, the properties, excluding thermal stability, were not sufficiently improved and the impact resistance was lowered.

TABLE 5

| | Item | Comp. Ex. 1 | Ex. 1 | Ex. 2 | Ex. 3 | Comp. Ex. 2 | Comp. Ex. 3 | Ex. 4 |
|---|---|---|---|---|---|---|---|---|
| Component | rubber-reinforced resin (A-1)-1 | 35 | 35 | 35 | 35 | 35 | 35 | 35 |
| | polymer (A-2)-1 | 50 | 50 | 50 | 50 | 50 | 50 | 50 |
| | epoxy halide B-1 | 15 | 15 | 15 | 15 | 15 | 15 | 15 |
| | antimony trioxide | 5 | 5 | 5 | 5 | 5 | — | — |
| | basic inorganic compound (amount as solid matter) D-1 | — | 100 ppm | 20 ppm | 500 ppm | 2000 ppm | — | 100 ppm |
| Properties | heat-stable coloring | X | ○ | ○ | ○ | ○ | X | ○ |
| | gelation | X | ○ | ○ | ○ | ○ | X | ○ |
| | adhesion to metal | X | ○ | ○ | ○ | X | X | ○ |
| | falling weight impact strength | 150 | 150 | 150 | 150 | 130 | 200 | 200 |
| | light resistance (Δ E) | ○ | ○ | ○ | ○ | ○ | ○ | ○ |

TABLE 6

| Item | Ex. 5 | Ex. 6 | Comp. Ex. 4 | Comp. Ex. 5 |
|---|---|---|---|---|
| Component | | | | |
| rubber-reinforced resin (A-1)-1 | 35 | 35 | 35 | 35 |
| polymer (A-2)-1 | 50 | 50 | 50 | 50 |
| epoxy halide | 15 | 15 | 15 | 15 |
| B-1 antimony trioxide | 5 | 5 | 5 | 5 |
| basic inorganic compound (amount as solid matter) | | | | |
| D-2 | 200 ppm | | | |
| D-3 | | 100 ppm | | |
| D-4 | | | 200 ppm | 1.0 part |
| Properties | | | | |
| heat-stable coloring | ○ | ○ | × | ○ |
| gelation | ○ | ○ | × | ○ |
| adhesion to metal | ○ | ○ | × | ○ |
| falling weight impact strength | 150 | 150 | 130 | 40 |
| light resistance (Δ E) | ○ | ○ | ○ | ○ |

Examples 7 and 8 and Comparative Example 6

The same procedure as that of Example 1 was repeated except that the styrene resins (A-1)-2 and (A-2)-2 were used in Example 7, that the epoxy halide B-2 was used in Examples 8 and that the epoxy halide B-3 of the sealed terminal type was used in Comparative Example 6. The results are given in Table 7.

TABLE 7

| Item | Ex. 7 | Ex. 8 | Comp. Ex. 6 |
|---|---|---|---|
| Component | | | |
| rubber-reinforced resin | | | |
| (A-1)-1 | | 35 | 35 |
| (A-1)-2 | 50 | | |
| polymer | | | |
| (A-2)-1 | | 50 | 50 |
| (A-2)-2 | 35 | | |
| epoxy halide | | | |
| B-1 | 15 | | |
| B-2 | | 15 | |
| B-3 | | | 15 |
| antimony trioxide | 5 | 5 | 5 |
| basic inorganic compound (amount as solid matter) | 100 ppm | 100 ppm | 100 ppm |
| D-1 | | | |
| Properties | | | |
| heat-stable coloring | ○ | ○ | ○ |
| gelation | ○ | ○ | ○ |
| adhesion to metal | ○ | ○ | ○ |
| falling weight impact strength | 100 | 130 | 150 |
| light resistance (Δ E) | ○ | ○ | × |

When B-3 (sealed type) was used, the light resistance was low (Comparative Example 6).

We claim:

1. A flame-retardant thermoplastic resin composition comprising:

a resin composition (C) composed of:

60 to 98% by weight of the total weight of said resin composition (C) of a thermoplastic resin (A) selected from the group consisting of:

a rubber-reinforced resin (A-1) obtained by polymerized a monomer component which is an aromatic vinyl monomer or a combination of the aromatic vinyl monomer with another monomer copolymerizable with this monomer in the presence of a rubber polymer and a mixture of the rubber-reinforced resin (A-1) and a polymer (A-2) of an aromatic vinyl monomer or a combination of the aromatic vinyl monomer with another monomer copolymerizable with this monomer and 40 to 2% by weight of the total weight of said resin composition (C) of a halogenated epoxy resin (B) having a terminal epoxy group(s) and represented by the following general formula (1):

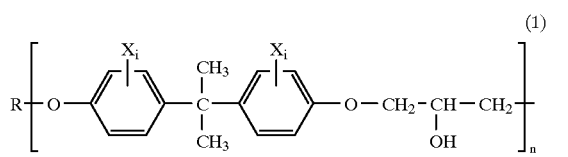

-continued

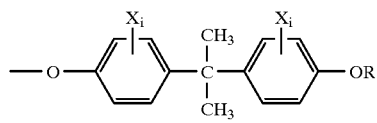

wherein X represents a halogen atom, n represents an integer of at least 0, i represents an integer in the range of 1 to 4, and R represents Y and/or Y", where:

Y:

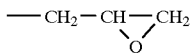

Y': hydrogen atom or

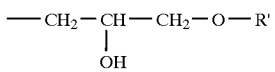

wherein R' is a phenyl group which may be substituted with an alkyl group and/or halogen atom, and the amount of Y is 100 to 40 molar % based on R, and 1 to 1,000 ppm, based on the total weight of said resin composition (C), of a based inorganic compound (D) soluble in a solvent; and wherein said flame-retardant thermoplastic resin composition is prepared by a process which comprises the steps of dissolving the basic inorganic compound (D) in a solvent and mixing the obtained solution with the resin composition (C).

2. The composition as claimed in claim 1, in which the basic inorganic compound (D) is a substance being soluble in water.

3. The composition as claimed in claim 1, comprising 70 to 98 present by weight of the total weight of the composition (C) of (A), 30 to 2 percent by weight of the total weight of the composition (C) of (B) and 1 to 800 ppm of (D).

4. The composition as claimed in claim 1, comprising 75 to 97 percent by weight of the total weight of the composition (C) of (A), 25 to 3 percent by weight of the weight of the composition (C) of (B) and 10 to 500 ppm of (D).

5. The composition as claimed in claim 1, in which the basic inorganic compound (D) is selected from the group consisting of sodium hydroxide, potassium hydroxide, sodium carbonate, potassium carbonate, sodium hydrogencarbonate and potassium hydrogencarbonate.

6. A process for producing a flame-retardant thermoplastic resin composition comprising:

a resin composition (C) composed of:

60 to 98% by weight of the total weight of said resin composition (C) of a thermoplastic resin (A) selected from the group consisting of:

a rubber-reinforced resin (A-1) obtained by polymerizing a monomer component which is an aromatic vinyl monomer or a combination of the aromatic vinyl monomer with another copolymerizable with this monomer in the presence of a rubber polymer and a mixture of the rubber-reinforced resin (A-1) and a polymer (A-2) of an aromatic vinyl monomer or a combination of the aromatic vinyl monomer with another monomer copolymerizable with this monomer and 40 to 2% by weight of the total weight of said resin composition (C) of a halogenated epoxy resin (B) having a terminal epoxy group(s) and represented by the following general formula (1):

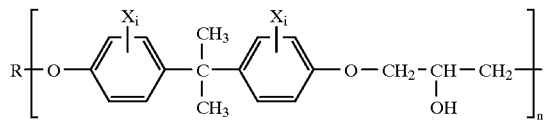

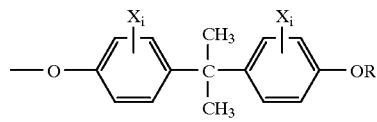

(1)

wherein X represents a halogen atom, n represents an integer of at least 0, i represents an integer in the range of 1 to 4, and R represents Y and/or Y', where:

Y:

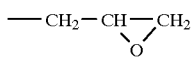

Y': hydrogen atom or

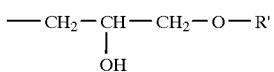

wherein R' is a phenyl group which may be substituted with an alkyl group and/or halogen atom, and the amount of Y is 100 to 40 molar % based on R, and 1 to 1,000 ppm, based on the total weight of said resin composition (C), of a basic inorganic compound (D) soluble in a solvent, and which process comprises the steps of dissolving the basic inorganic compound (D) in a solvent and mixing the obtained solution with the resin composition (C).

7. The process as claimed in claim 6, in which the solvent is water.

8. The process as claimed in claim 6, in which the basic inorganic compound (D) is selected from the group consisting of sodium hydroxide, potassium hydroxide, sodium carbonate, potassium carbonate, sodium hydrogencarbonate and potassium hydrogencarbonate.

9. A resin composition obtained by the process as defined in claim 6, 7 or 8, said resin composition having a falling weight impact strength of 130 kgcm or more, and heat-stable coloring when kneaded at 100 rpm's in a labo-plasto mill kept at 270° C.

* * * * *